E. S. LAUTNER.
FRUIT GRADER.
APPLICATION FILED FEB. 24, 1919.
1,337,924.
Patented Apr. 20, 1920.
3 SHEETS—SHEET 1.
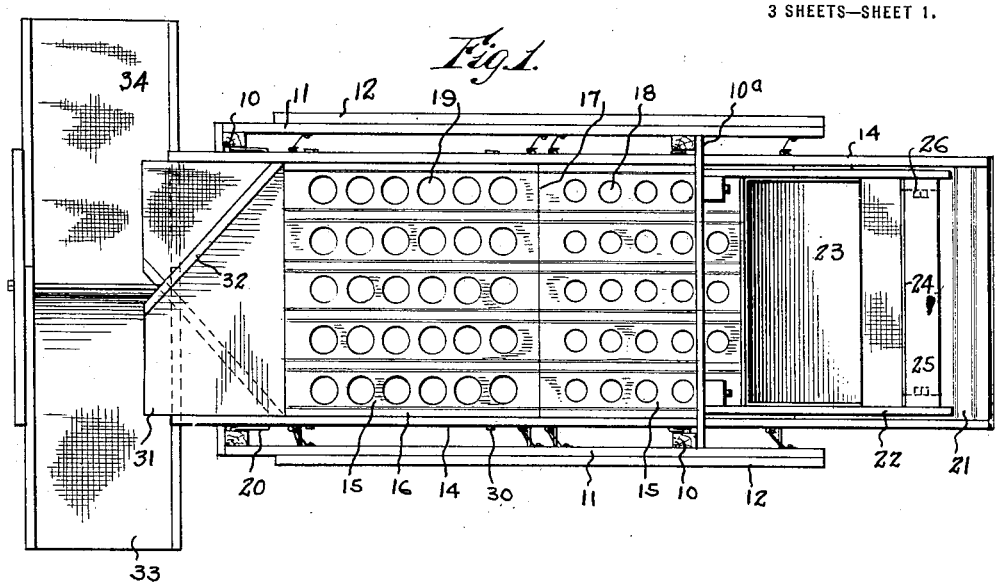
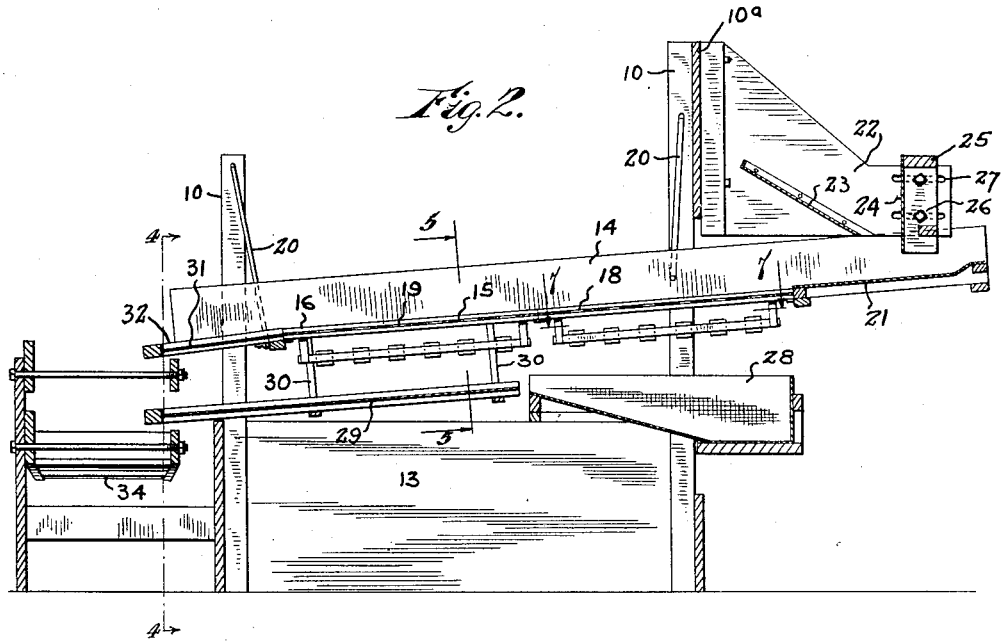
WITNESSES
INVENTOR
Ernest S. Lautner,
BY
ATTORNEYS

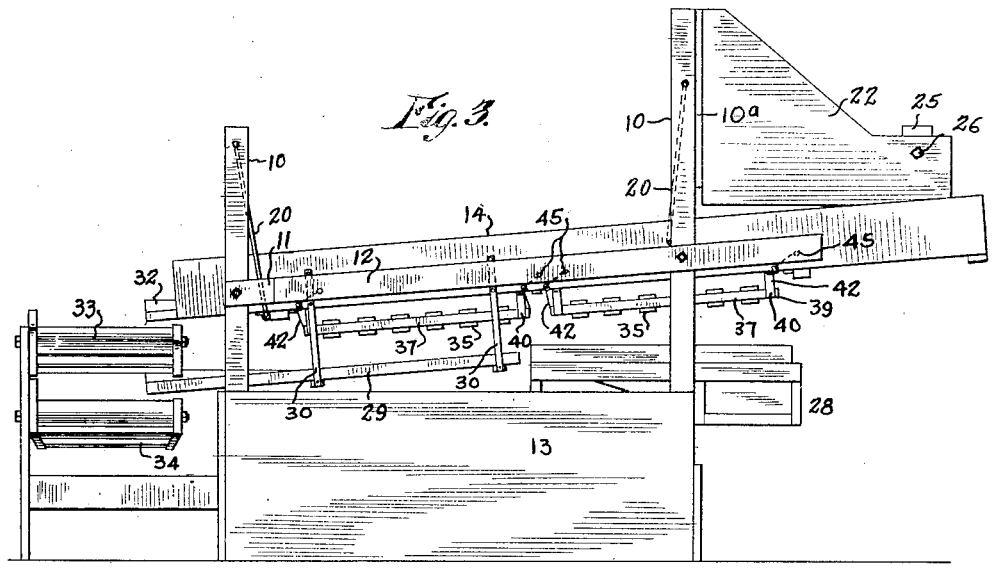

E. S. LAUTNER.
FRUIT GRADER.
APPLICATION FILED FEB. 24, 1919.
1,337,924.
Patented Apr. 20, 1920.
3 SHEETS—SHEET 3.
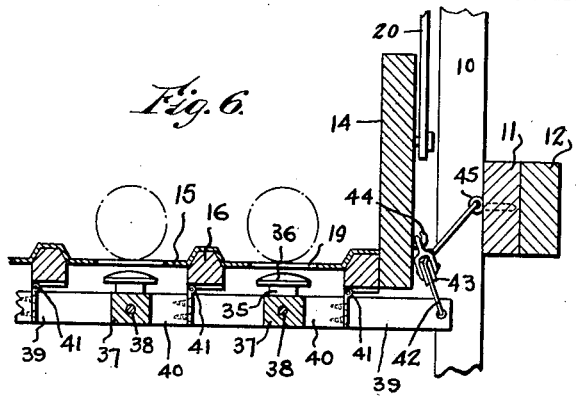
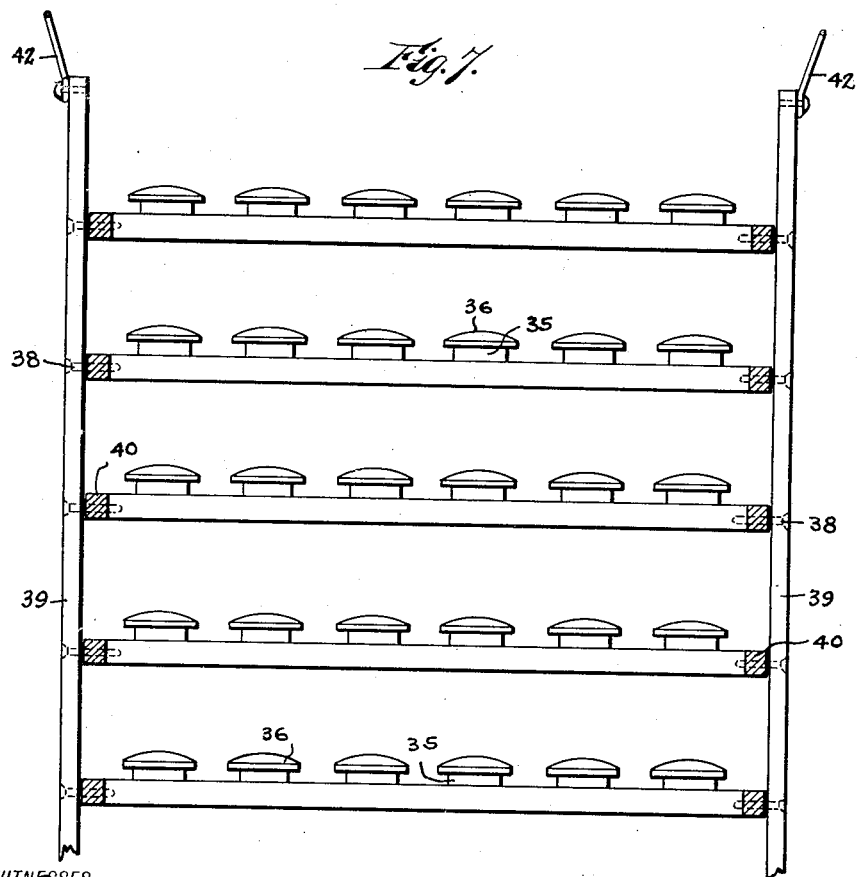
WITNESSES
INVENTOR
Ernest S. Lautner,
BY
ATTORNEYS

UNITED STATES PATENT OFFICE.

ERNEST STEPHEN LAUTNER, OF SOLON TOWNSHIP, LEELANAU COUNTY, MICHIGAN.

FRUIT-GRADER.

1,337,924.          Specification of Letters Patent.          Patented Apr. 20, 1920.

Application filed February 24, 1919. Serial No. 278,725.

*To all whom it may concern:*

Be it known that I, ERNEST S. LAUTNER, a citizen of the United States, and a resident of Solon township, in the county of Leelanau and State of Michigan, have invented a new and Improved Fruit-Grader, of which the following is a description.

My invention relates to a machine for grading fruits and more particularly is intended for use in grading apples into given sizes.

The general object of the invention is to provide a machine of a character to facilitate the process of packing apples in various grades according to size, and to provide a simple structure that will handle the fruit without bruising. In attaining the stated object and in developing a mechanical form of the machine to reflect practical considerations of construction, operation and adjustment, use is made of a grader frame or structure over which the fruit may roll, said frame being mounted to be oscillated and advantageously arranged for manual operation. The grader frame presents openings which in practice are in series affording escape of grades representing given sizes (within the predetermined limits of the respective series of openings) while excluding all fruit not within the limits of the respective escape openings; and in connection with the oscillating grading frame means of a novel character is provided to dislodge or displace all fruit lodging in the openings to thereby permit the fruit to roll onward so that the larger sizes will tail off at the end as one of the several sizes into which the fruit is graded.

Reference is to be had to the accompanying drawings forming part of this specification, it being understood that the drawings are merely illustrative of one example of the invention.

Figure 1 is a plan view of a grading machine embodying my invention;

Fig. 2 is a longitudinal vertical section taken approximately centrally of the machine;

Fig. 3 is a side elevation;

Fig. 4 is a transverse section on the line 4—4, Fig. 2;

Fig. 5 is a transverse section on the line 5—5 Fig. 2;

Fig. 6 is an enlarged detail of a portion of the grader frame and the displacing means with actuating means for the latter, the view corresponding with parts shown at the right of Fig. 5 but with the displacing means moved to a position to dislodge the fruit from the openings of the grader;

Fig. 7 is an enlarged sectional plan view as indicated by the line 7—7, Fig. 2.

A suitable supporting framework is provided here shown as consisting of end posts 10 to which side strips are secured, there being strips 11 directly secured to said posts at each side and outer strips 12 applied to the first mentioned strips. At the lower part of the frame structure inclosing boards may be applied including side boards 13. An inclined grader frame or structure designated generally by the numeral 14 is accommodated between the posts 10 to have freedom of movement and the bottom 15 is formed in two sections, the numeral 17, Fig. 1, indicating the dividing line, the said bottom sections being removable to substitute ones presenting grading opening of different sizes according to the general character of the fruit being graded. Also, the sections 15 present longitudinal ribs 16, the material forming the bottom being continued over the ribs as best seen in Fig. 6, to provide a cushion, the cushion being further insured by any additional material. The sections 15 have, respectively, openings 18 and 19 of different sizes, the smaller sizes being toward the head or feed end of the grader and the latter is mounted to oscillate, there being shown for the purpose hangers 20 rockably mounted at their upper ends in the posts 10. At the feed end of the grader 14 is a stretched canvas 21 onto which the fruit falls from a hopper 22, the inclined bottom 23 of which is preferably of canvas and the front 24 also, said front being secured to a frame 25 adjustably secured by bolts 26 received in slots 27 formed in the sides of the hopper to permit of adjustment of said front canvas 24 toward or from the lower end of the bottom 23 for varying the outlet of the hopper. The hopper 22 as a whole is suitably supported in frame parts 10ª in the frame 10. Fruit of the smaller sizes escaping through holes 18 may drop to a chute or the like 28 preferably having a canvas bottom, while fruit escaping through the larger openings 19 of the next section 15 will drop onto a tray 29 also of canvas, said tray being rigidly hung by any suitable means such as hangers 30 or the like from the sides of the grader 14. The larger fruit excluded from the openings in the grader will pass to the plain end 31 to tail off the same, the fruit being deflected laterally by an oblique side bar 32, so that the fruit will be directed to a chute 33. The fruit tailing off the tray 29 will drop to a chute 34, the chutes 33, 34 preferably leading to opposite sides of the machine. In practice, the operator standing adjacent to the head of the oscillating grader 14 may impart necessary movement thereto and incidentally may pick out culls.

In order to displace fruit lodging in the openings 18, 19, I provide kickers corresponding with the individual openings. In practice, the individual kickers or displacing heads 35 have cushions 36. The heads or kickers 35 are arranged in series disposed longitudinally of the grader 14, there being preferably a system of kickers for the openings 18 of the first section 15 of the grader and a second system of kickers for the series of openings 19 in the second section 15 of the grader, the advantage being that the operation of the kickers is thus better provided for. Each longitudinal series of kickers or heads 35 is carried by a longitudinally disposed bar 37 and in each system the several bars 37 are pivotally mounted as at 38 in side bars 39 of a frame suspended beneath the grader. Said side bars range transversely beneath the grader 14 and adapted as will appear to have a swinging parallel movement transversely of the grader. In addition to the pivoting of the longitudinal bars 37 to the side bars or cross bars 39 of the kicker frame, said bars 37 have arms 40 which are hinged as at 41 to the under side of the respective ribs 16 of the grader frame (see Figs. 5 and 6). To actuate the cross bars 39, the same have connected thereto at each end a wire, cord, or other flexible medium 42, and said wires or cords run over idlers 43 hung as by hooks 44 on the outer sides of the grader 14, the opposite ends of the cords or wires being made fast as at 45 to the bars 11 or other convenient fixed part of the framework. The arrangement is such that as the grader 14 is oscillated longitudinally, the idlers 43 will travel along the cords or wires 42 and move the cross bars 39 laterally and upwardly with a parallel movement alternately toward and from the under side of the grader sections 15, thereby swinging the bars 37 carrying the kicker heads 35 through an arc of approximately 90° as will be observed from comparison of Figs. 5 and 6.

At the same time, by reason of the hinging of the arms 40 of the bars 37 at 41 to the ribs 16, said bars 37 will be given a turning movement about the pivots 38 thereby swinging the kicker heads 35 through an arc with the pivots 38 as a center to carry said heads 35 and their cushions 36 adjacent to and in register with the respective openings 18, 19 in the grader sections to thus dislodge the larger fruit from said openings and permit the fruit to roll onward. It will thus be seen that the movements of the kickers and their suspended carrying frames is incidental to the oscillating of the grader frame and dislodgment of the fruit from the individual openings is assured.

I would state in conclusion that while the illustrated example constitutes a practical embodiment of my invention, I do not limit myself strictly to the mechanical details herein illustrated since manifestly the same can be considerably varied without departure from the spirit of the invention as defined in the appended claims.

Having thus described my invention, I claim as new, and desire to secure by Letters Patent:

1. A grader for fruits including a grader frame movably mounted and having openings therein for the escape of fruit of a given size, and means beneath the openings and actuated toward and from the latter by the movements of the grader frame to dislodge fruit from said openings.

2. A fruit grader including a grader frame movably mounted and presenting openings for the escape of fruit, and means to displace fruit lodging in said openings, said means including a frame suspended beneath the grader frame, means to move the suspended frame transversely of the grader frame, bars pivotally mounted in said suspended frame to turn about their individual axes, and means to give said turning movement to said bars with the transverse movement of said suspended frame.

3. A machine of the class described including a movably mounted grader frame having openings for fruit of a given size, a frame suspended beneath the grader frame, an operating connection between said suspended frame and said grader frame arranged whereby movement of the grader frame will impart a parallel movement to said suspended frame transversely of the grader frame with the movements of the latter, and kicker means carried by said suspended frame to displace the fruit lodging in the openings of the grader frame.

4. A fruit grader including a movably mounted grader frame presenting openings in the bottom for the escape of fruit, a tray carried by said grader frame to receive the fruit passing through the openings, and means disposed between the grader frame and tray and operative by movements of said frame to displace fruit lodging in said openings.

5. In a fruit grader, a fixed structure, a grader frame movably mounted in said structure and having openings for the escape of fruit, means beneath said grader frame to dislodge fruit from said openings, flexible elements made fast to the last-mentioned means and to said fixed structure, and means on said grader frame engaging said flexible elements to actuate the fruit dislodging means.

ERNEST STEPHEN LAUTNER